Sept. 20, 1966 C. C. YOUNG 3,274,344

AUTOMATIC DIALING DEVICE

Filed June 14, 1963 3 Sheets-Sheet 1

INVENTOR:
CHARLES C. YOUNG

BY Raymond R. Skolnick

Sept. 20, 1966 C. C. YOUNG 3,274,344

AUTOMATIC DIALING DEVICE

Filed June 14, 1963 3 Sheets-Sheet 2

INVENTOR:
CHARLES C. YOUNG

BY Raymond R. Skolnick

Sept. 20, 1966 C. C. YOUNG 3,274,344

AUTOMATIC DIALING DEVICE

Filed June 14, 1963 3 Sheets-Sheet 3

INVENTOR:
CHARLES C. YOUNG

BY
Raymond R. Skolnick

United States Patent Office 3,274,344

Patented Sept. 20, 1966

3,274,344

AUTOMATIC DIALING DEVICE

Charles C. Young, New Rochelle, N.Y., assignor, by mesne assignments, to Prestodial, Inc., New York, N.Y., a corporation of New York Filed June 14, 1963, Ser. No. 287,856
8 Claims. (Cl. 179—90)

This invention relates to telephone dialing devices and more particularly to a cam actuated means for the automatic dialing of telephone numbers or private communication systems.

Heretofore, automatic dialing devices have employed a mechanical arm which fits over the standard circular dialing mechanism attached to telephones, said arm mechanically turning the dialing mechanism upon being actuated by some code designation. Other types of automatic dialing devices have employed magnetic tapes or drums for storing the telephone numbers. Although tapes and drums have the capacity for large storage they require some type of readout equipment which is bulky, expensive and troublesome. Those dialing systems employing cams use multiple selector switches and lack the ability for readily interchanging the cams which are the code storage means.

It is therefore an object of this invention to provide an improved means for automatically dialing telephone numbers.

Another object of this invention is to provide an automatic dialing device wherein mechanical cams are used for storing the telephone numbers or code designations.

A still further object of this invention is to provide an automatic dialing device wherein the telephone numbers or code designations are readily changeable.

A still further object of this invention is to provide an automatic dialing device which can be plugged into a phone jack without cutting into existing communication wires.

A still further object of this invention is to provide an improved external actuator means for automatic dialing of telephone numbers.

To these ends the invention contemplates the use of a plurality of cams on which telephone numbers or code designations are stored. These cams upon being activated rotate and actuate a microswitch which interrupts the current flowing through the existing communications line thereby providing a series of pulses in accordance with the stored information on the cams.

Another means contemplated by the invention is the use of a solenoid for providing the pulsing means. The microswitch, upon being actuated by a cam, makes and breaks the the circuit which actuates the solenoid. The solenoid is positioned above the cradle of a telephone so that the solenoid can actuate the cradle buttons thereby making and breaking the communication circuit whenever the solenoid is actuated, in accordance wth the stored information on the cams.

The cams are positioned on a shaft which is rotated by a motor, the motor being activated by an operator pushing a starting button. The particular cam carrying the numbers or stored information to be utilized is selected by the operator by means of an indexing mechanism. Once the selection is made and the starting button is depressed the cams rotate and the selected information on the cam actuates the microswitch which in turn makes and breaks the communication circuit either through the use of the solenoid means or through the jack plug, thereby creating a series of pulses in accordance with the stored information on the particular cam selected.

Whichever method is used the pulses generated are the same pulses which are created by the normal dialing system of a telephone.

The invention has other objects and advantages which will appear from the following description of a particular embodiment of the invention in conjunction with the accompanying drawings, in which.

Figure 2:
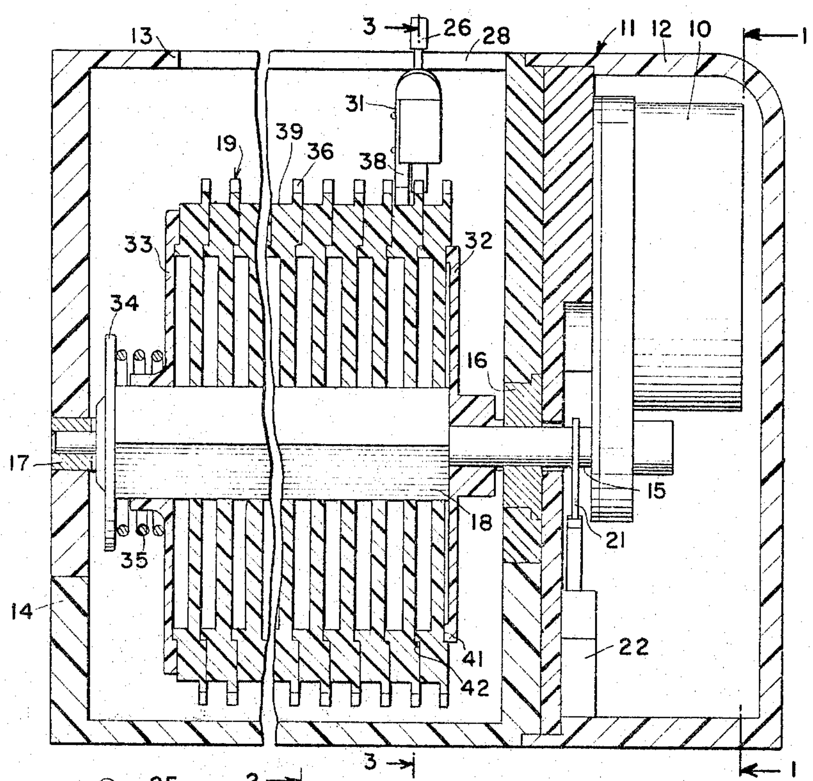
FIG. 2 is a side sectional view of the invention showing the storage cams and the microswitch actuated by them taken along lines 2—2 of FIG. 1.
Figure 1:
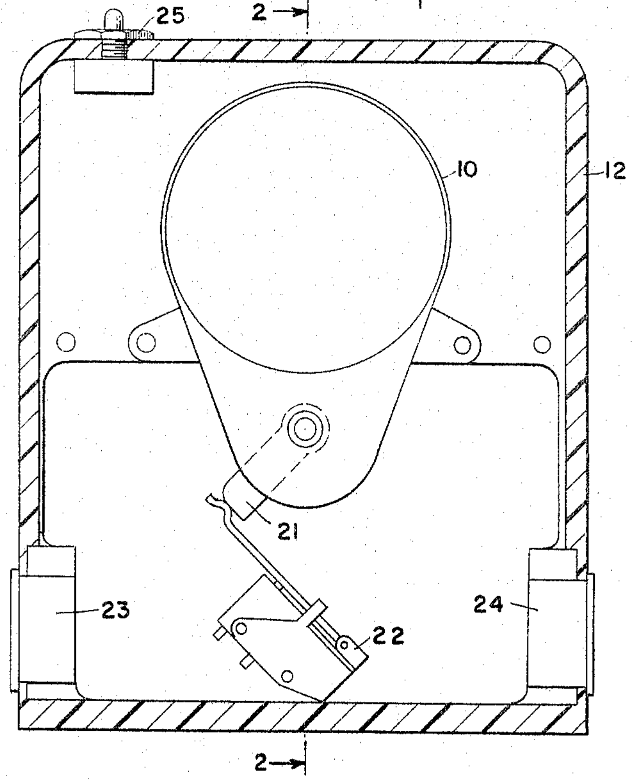
FIG. 1 is a front sectional view of the invention showing the motor, a cycle control cam and a cycle control microswitch taken along lines 1—1 of FIG. 2.

With reference to FIGS. 1 and 2 a synchronous motor 10 is positioned within the front of a case 11, the case consisting of a front part 12, an upper rear part 13 and a lower rear part 14. The motor drives a shaft 15 which is supported by a front bearing 16 and a rear bearing 17, the bearings 16 and 17 being mounted in the upper rear part 13 of the case 11. The central part of shaft 15 is square shaped 18 so as to provide means for properly locating a plurality of cams 19.

About the front part, of the shaft 15, is mounted a cycle control cam 21. This cycle control cam actuates a cycle control microswitch 22 which is mounted within the front part 12 of the case 11. On either side of the case 11 there is provided five point connectors 23 and 24. These connectors are provided for the purpose of allowing the invention to be cascaded to similar units and for simplicity in bringing in and taking out wires or leads.

A starting button 25 is mounted on the top of the case for starting the synchronous motor 10. A knob 26, which is used as an index, is connected to an indexing spring 27 (see FIG. 3) through a slot 28 which is in the upper rear 13 of the case 11. The indexing spring is positioned by a series of grooves 29 which are on the underside of the top part of the upper rear 13 of the case 11. These grooves are positioned so as to be above each of the cams 19. The indexing spring supports a microswitch 31 which is carried along with the indexing spring as it is moved from groove to groove.

Mounted about the front part of the shaft 15 is a front retainer plate 32. About the squared rear part of the shaft 18 is mounted a rear retainer plate 33. Between a washer 34, which is fastened to the rear of shaft 15 and the rear retainer plate is a spring 35. The spring is provided for biasing the cams between the retainer plates so that the cams maintain a positive position in relation to the grooves 29. The spring also allows the cams to be spread apart so that one may be removed or added, as the case may be, without disassembling the entire structure. This procedure will more fully be explained later on in the disclosure.

Figure 3:
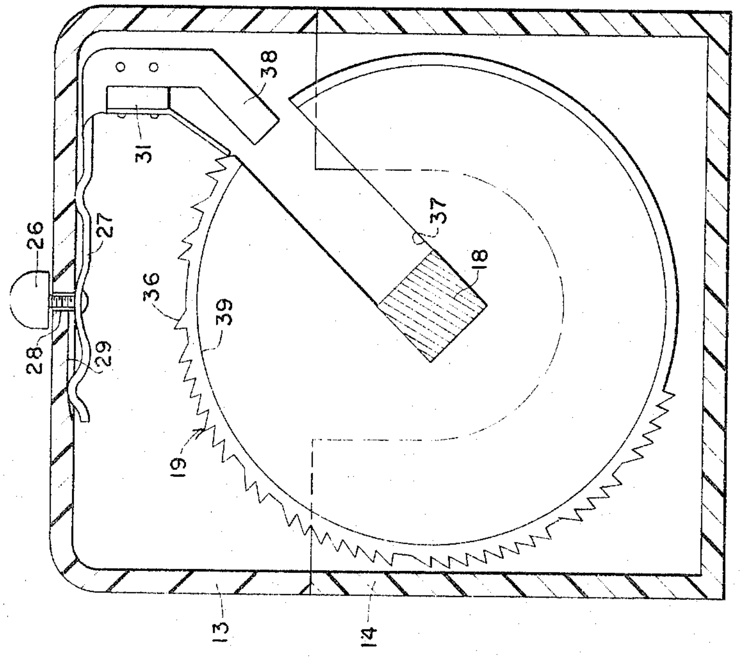
FIG. 3 is a sectional view of a particular storage cam and the indexing mechanism taken along lines 3—3 of FIG. 2.

A particular cam of the cams 19, as shown in FIG. 3, is circular with a series of teeth 36 on the periphery thereof. As shown on this particular cam the teeth correspond to numbers 212–172–7845. The cam has a slot 37 therein, the slot fitting over the square part 18 of shaft 15. The indexing spring 27 has as part thereof a guidance arm 38 which rides over a shoulder 39, which is on the cams 19. The shoulder, through the guidance arm, maintains the position relationship of the microswitch and the teeth on the particular cam selected. The cams are so made as to have a front recess 41 therein and a rear shoulder 42 thereon whereby the cams can nest within each other.

This particular configuration lends itself to easy interchangeability of the cams. Should the operator desire to change a number or stored code he merely removes the lower part 14 of the case 11. The removal of this part of the case exposes the cams 19. The cams are spread apart and the particular cam which is to be removed is readily pulled out. The same procedure is utilized for inserting or exchanging a cam.

Therefore, it is readily apparent that one does not have to disassemble the entire mechanism to change, insert or remove a particular cam.

Figure 5:
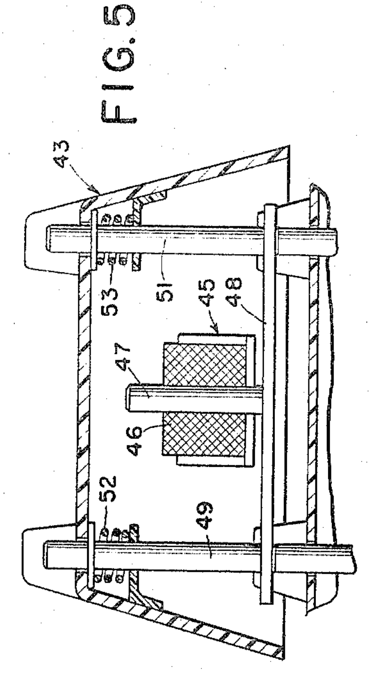
FIG. 5 is a sectional view of the alternate embodiment of the invention taken along lines 5—5 of FIG. 4.
Figure 4:
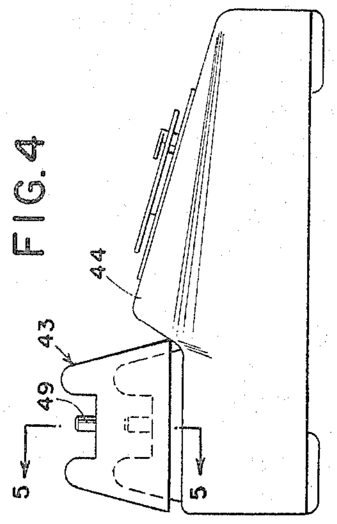
FIG. 4 is a side elevational view of a telephone headset showing the alternate embodiment of the invention.

With reference to FIGS. 4 and 5 there is shown an actuator mechanism 43. The mechanism which fits over the cradle part on the rear of a telephone 44, has the same basic shape as that part of the telephone which it fits over. Mounted within the actuator mechanism 43 is a solenoid 45, consisting of a solenoid coil 46 and a rod 47. Attached to the rod 47 is a plate 48. Positioned above the existing cradle buttons of the telephone are rods 49 and 51. These rods are spring-biased by springs 52 and 53, respectively, so as to be in a raised position unless depressed by a telephone headset (not shown).

Figure 6:
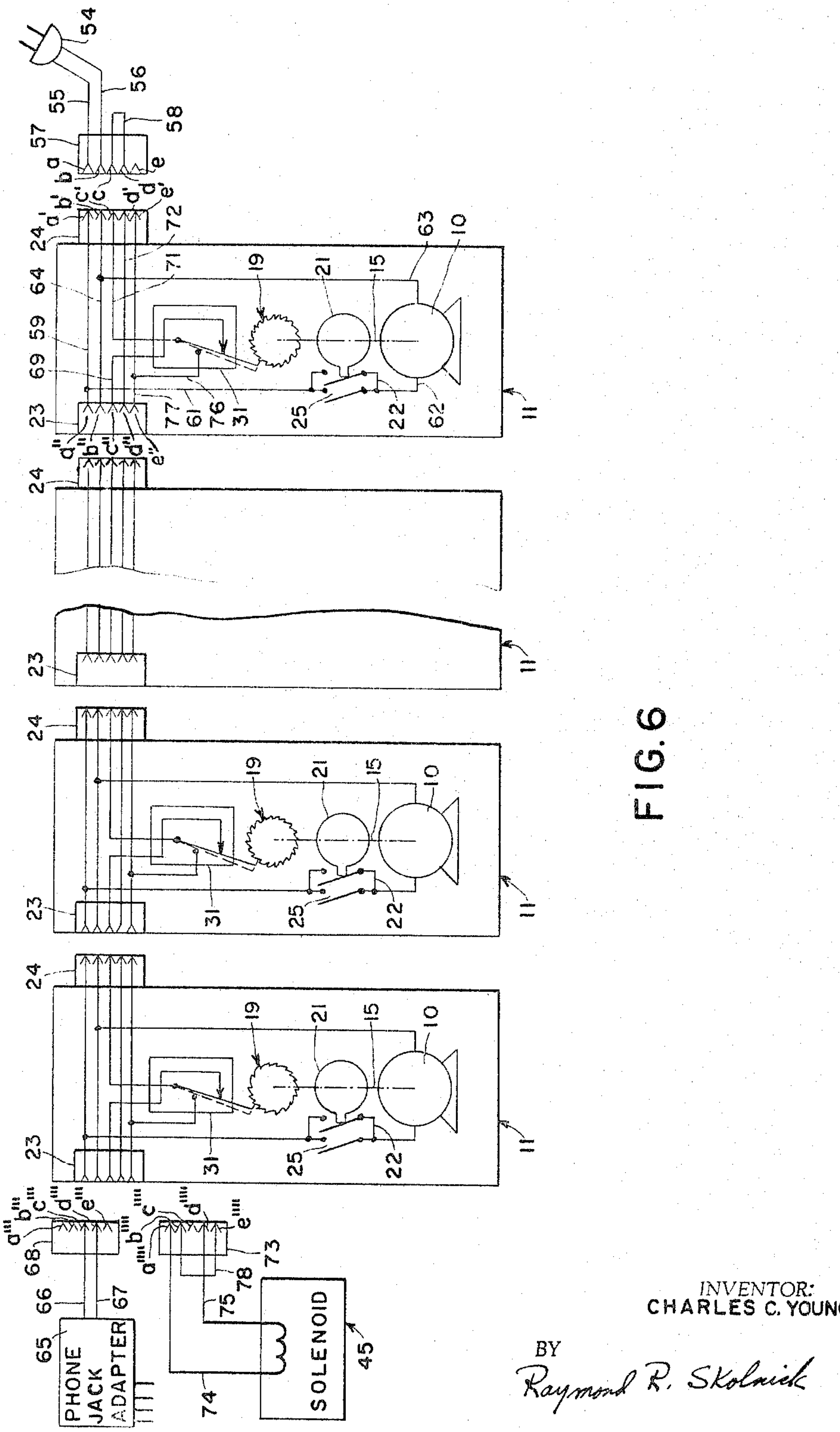
FIG. 6 is a schematic representation of a particular means for the electrical circuitry of the invention.

The operation of the invention will now be more fully explained in conjunction with the schematic shown in FIG. 6.

The invention is connected to any convenient wall outlet or similar device which supplies current preferably 110 v. A.C. by means of a plug 54. The plug is connected by means of leads 55 and 56 to a female connector 57 which has 5 terminals *a*, *b*, *c*, *d* and *e*. Terminals *c* and *d* are connected to each other either internally or as shown by means of lead 58. The connector 57 is connected to male plug 24 which is attached to the case 11 of the invention.

The operator selects the person he wishes to contact by phone by sliding the index knob 26 to the position which represents this particular person. In practice an index sheet would be applied to the top of the case and on which the names of individuals, firms or their telephone numbers would be recorded. The positioning of the index knob 26 by means of the index spring 27 positions the microswitch 31 over the particular cam which coincides or carries the stored information representative of the phone number of the individual or firm selected to be contacted. The cams, while the invention mechanism is in the off position, are always aligned so that its slot 37 coincides with the guidance arm 38 of the indexing spring 27. The cams by being in this position allow the guidance arm and microswitch to move to any position, along the case, without interference with the cams.

The starting button 25 is pushed thereby allowing the current to be placed across the motor 10 by means of plug 54, lead 55, connector 57 (terminal *a*), connector 24 (terminal *a'*), lead 59, lead 61, starting button 25, lead 62, motor 10, lead 63, lead 64, connectors 24 (terminal *b'*), connector 57 (terminal *b*) and lead 56. Once the motor 10 is started the cycle control cam 21 revolves and the cycle control microswitch 22 is closed. The cycle control microswitch remains closed until the motor has made a complete revolution whereby the cycle control cam 21 returns to the position in which it opens the microswitch 22. With the cycle control microswitch closed the current will continue to go across the motor 10 even with the starting button in a raised position. This means that the operator presses the starting button and as soon as the motor is activated he can release the button and the mechanism will continue to operate for one (1) complete cycle (one revolution of the motor).

With the motor 10 activated shaft 15 will rotate the cams 19. The microswitch 31 is normally in an open position and the teeth 36 on the particular cam selected will close the microswitch in accordance with the particular sequence with which they were positioned on the cam.

In one mode of operation where a jack is used a phone jack adapter 65 is plugged into the existing jack at the installation site. The existing jack is connected to a central switchboard and its associated equipment. The leads 66 and 67, which are connected to a male connector 68, are substantially the same type of leads which normally come from a dialing phone; the leads which carry the information of the standard dialing mechanism. When the phone headset is removed from the cradle buttons these leads are closed and when the phone headset depresses the buttons these leads are open. This is done by means of a switch which is in the existing telephone.

Assuming these leads are closed and the microswitch is closed (by the cam teeth) the circuit is completed by means of lead 66, connector 68 (terminal *c'''*), connector 23 (terminal *c''*), lead 69, microswitch 31, lead 71, connector 24 (terminal *c'*), connector 57 (terminal *c*), lead 58, connector 57 (terminal *d*), connector 24 (terminal *d'*), lead 72, connector 23 (terminal *d''*), connector 68 (terminal *d'''*) and lead 67. Therefore, as the cam rotates, current coming through the jack from the central switchboard will be broken in a particular sequence by the actuation of the microswitch, the sequence being the same as the stored information on the cam which is activating the microswitch, similar to the way the curernt is broken by the standard dialing mechanism on existing phones.

In the other mode of operation where a phone jack adapter is not utilized but an actuator 43 is utilized the invention is connected to a source of current in the same manner as in the phone jack adapter mode. It is started in the same manner by depressing the starting button 25 and the cycle control cam 21 and the cycle control switch 22 operate in the same manner. However, in this mode of operation the current source is also applied to the solenoid by means of lead 55, connector 57 (terminal *a*), connector 24 (terminal *a'*), lead 59, connector 23 (terminal *a''*), connector 73 (terminal *a''''*), lead 74, solenoid 45, lead 75, connector 73 (terminal *d''''*), connector 23 (terminal *d''*), lead 72, connector 24 (terminal *d'*), connector 57 (terminal *d*), lead 58, connector 57 (terminal *c*), connector 24 (terminal *c'*), lead 71, microswitch 31 (in open position as shown by dotted line), lead 76, lead 77, connector 23 (terminal *e''*), connector 73 (terminal *e''''*), lead 78, connector 73 (terminal *b''''*), connector 23 (terminal *b''*), lead 64, connector 24 (terminal *b'*), connector 57 (terminal *b*), and lead 56.

It has thus been shown that as one of the cams 19 opens and closes the microswitch 31, the solenoid 45 is activated in accordance therewith. As the solenoid is activated it in turn opens and closes the dialing circuit by means of rod 47 (which is directly positioned by the soleniod coil) and plate 48. The dialing circuit is controlled by the buttons on the phone, performing the same function as if the standard dialing mechanism was used.

Although I have described particular embodiments of the invention, it is understood that the present disclosure has been made by way of example and that numerous changes in the details of construction and the combination and arrangement of parts may be resorted to without departing from the spirit and the scope of the invention as hereinafter claimed.

What is claimed is:

1. An automatic dialing mechanism comprising, a shaft, means for rotating said shaft, at least one of code storage means mounted on said shaft, a means for positioning said code storage means relative to said shaft, a switch means mounted so as to be in contact relationship wtih one of said code storage means and a soleniod having actuating means mounted to the cradle of a telephone, said soleniod being connected to said switch means whereupon said switch means being actuated by said code storage means activates said solenoid actuating means for sequentially actuating the cradle buttons of said telephone.

2. An automatic dialing mechanism according to claim 1 wherein said shaft is square shaped in that portion upon which said code storage means is mounted.

3. An automatic dialing mechanism according to claim 2 wherein said code storage means is a circular cam having teeth placed sequentially on the periphery thereof in accordance with the coded information to be stored, said cam having a square slot therein which extends from the periphery through the center for mounting said cam on said shaft, said cam having a shoulder for maintaining said switch means in a contact position with said teeth.

4. An automatic dialing mechanism comprising, a case, a shaft rotatably supported by said case, a plurality of cams mounted on said shaft, said shaft having a square shape in that portion upon which said cams are mounted, said cams being circular and having teeth sequentially positioned about the periphery thereof in accordance with coded information to be stored, said cams having a square slot therein which extends from the periphery through the center and having a shoulder in juxtaposition to said teeth, a motor attached to one end of said shaft for rotating said shaft, a cycle control cam mounted on said shaft, a cycle control microswitch mounted in said case and positioned so as to be actuated by said cycle control cam, a front retainer plate for positioning said circular cams relative to said shaft, a rear retainer plate which is biased for maintaining said circular cams against said front retainer plate, a spring for biasing said rear retainer plate, a starting button mounted on the top of said case and connected electrically to said motor, an index spring, an index knob connected to said index spring through a slot in the top of said case, said case having a series of grooves positioned relative to said circular cams for indexing said index spring, a microswitch attached to said index spring, said microswitch having a guidance arm which rides on the shoulder of said circular cams for maintaining said microswitch in contact position with said teeth of said circular cams and a pulsing means connected to said microswitch whereby the actuation of said microswitch by said teeth sequentially pulses said pulsing means in accordance with the stored information on said circular cams.

5. An automatic dialing mechanism according to claim 4 wherein said pulsing means is a phone jack adapter.

6. An automatic dialing mechanism according to claim 4 wherein said pulsing means is a solenoid having actuating means mounted to a cradle of a telephone, said solenoid upon being actuated by said microswitch actuating the cradle buttons of said telephone.

7. An automatic dialing mechanism comprising, a shaft, means for rotating said shaft, at least one code storage means mounted on said shaft, said code storage means being a circular cam having teeth placed sequentially on the periphery thereof in accordance with the coded information to be stored, said cam having a square slot therein which extends from the periphery through the center for mounting said cam on said shaft, said cam having a shoulder for maintaining said switch means in a contact position with said teeth, said shaft being square shaped in that portion upon which said code storage means is mounted, a means for positioning said code storage means relative to said shaft, a switch means mounted so as to be in contact relationship with one of said code storage means and a pulsing means connected to said switch means whereby the actuation of said switch means by any of said code storage means sequentially pulses said pulsing means in accordance with the stored information on said code storage means.

8. An automatic dialing mechanism comprising, a shaft, means for rotating said shaft, at least one code storage means mounted on said shaft, said code storage means being a circular cam having teeth placed sequentially on the periphery thereof in accordance with the coded information to be stored, said cam having a square slot therein which extends from the periphery through the center for mounting said cam on said shaft, said cam having a shoulder for maintaining said switch means in a contact position with said teeth, said shaft being square shaped in that portion upon which said code storage means is mounted, a means for positioning said code storage means relative to said shaft, a switch means mounted so as to be in contact relationship with one of said code storage means and a phone jack adapter connected to said switch means whereby the actuation of said switch means by any of said code storage means sequentially pulses said phone jack adapter in accordance with the stored information on said code storage means.

References Cited by the Examiner

UNITED STATES PATENTS 3,118,976 1/1964 Scott ............... 179—90.2

KATHLEEN H. CLAFFY, *Primary Examiner.*

S. J. BOR, *Assistant Examiner.*